Patented June 23, 1936

2,045,304

UNITED STATES PATENT OFFICE 2,045,304

INTERMEDIATES AND DYESTUFFS OF THE ANTHRIMIDE TYPE

Ralph N. Lulek, Milwaukee, and Clarence F. Belcher, South Milwaukee, Wis., assignors to E. I. du Pont de Nemours & Company, Wilmington, Del., a corporation of Delaware No Drawing. Application May 18, 1934, Serial No. 726,292

6 Claims. (Cl. 260—60)

This invention relates to the preparation of new intermediates and dyestuffs of the anthraquinone series, and more particularly to new di-alpha, alpha-(anthraquinonyl-amino-anthraquinone)-dicarboxylic acid di-imides of the general formula:

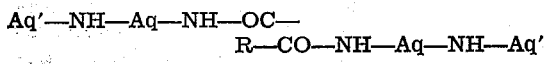

wherein R is an aliphatic, carbocyclic or heterocyclic radical, and the Aq's represent anthraquinone radicals.

U. S. Patents 938,565 and 938,566 disclose the preparation of dyestuffs by condensing amino or substituted amino-anthraquinones with dicarboxylic acids of the aliphatic and aromatic series. According to these patents, the substituents that may be present in the anthraquinone molecule are chloro, amino, oxy, methoxy, nitro, methylamino and tolylamino. Later patents, such as U. S. 1,651,461, 1,877,791, and 1,911,714 have carried forward the invention disclosed in the earlier patents and disclose the use of other dicarboxylic acids. They also use other simple substituted amino-anthraquinones, particularly those containing aroylamino groups.

We have found that when amino-chloroanthraquinone compounds are condensed with aliphatic or cyclic dicarboxylic acid chlorides, the compounds which are obtained, having the general formula:

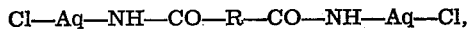

may be further condensed with amino-anthraquinone compounds to produce new and valuable products, many of which themselves have dyestuff properties and which are also useful for the preparation of more valuable dyestuffs of the anthrimide-carbazole series.

In the preparation of our new compounds, alpha-amino-alpha or beta-chloro-anthraquinone compounds are condensed with dicarboxylic acids by the usual methods employed for producing aroylamino-anthraquinones, and the resulting dichloro condensation products are condensed with amino-anthraquinone compounds by the methods generally employed in the prior art for the preparation of anthrimides. The aminoanthraquinone compounds used in the second condensation step may contain other substituents such as hydroxy, methoxy, halogen, amino or acidylamino groups of the aliphatic or aromatic series.

The preparation of the compounds of our invention will be more fully illustrated by the following examples, in which the parts used are by weight.

Example 1

18.5 parts of terephthaloyl-di-(1-amino-5-chloro-anthraquinone), 12.8 parts of alpha-amino-anthraquinone and 10 parts of sodium acetate are heated under addition of 0.7 parts of copper chloride in 300 parts of nitrobenzol to boil for 5 hours. The mass is cooled to about 50° and filtered. The cake is washed with nitrobenzol, alcohol and water, and dried. The resulting terephthaloyl-bis-(5-amino-1,1'-dianthrimide) is a dark brown powder which dissolves in sulfuric acid with a greenish color.

If, in the above example, the terephthaloyl-di-(1-amino-5-chloro-anthraquinone) is replaced by terephthaloyl-di-(1-amino-6-chloro-anthraquinone) a terephthaloyl-bis-(5-amino-2,1'-dianthrimide) is obtained.

Example 2

30 parts of 1-amino-5-chloro-anthraquinone are suspended in 300 parts of nitrobenzol and 12 parts of terephthaloyl chloride are added at room temperature. The mass is heated to 130–140° C. for one hour and then cooled to 80–100°. The bright yellow crystalline precipitate is filtered off, washed with nitrobenzol and alcohol and dried.

20 parts of the above condensation product are heated with 21.5 parts of monobenzoyl-1,5-diamino-anthraquinone and 18 parts of sodium carbonate, 1 part of cupric chloride in 400 parts of nitrobenzol to the boil. The mass is kept boiling for 4–6 hours and then cooled to 100–120° C. and filtered. The cake is washed with nitrobenzol, alcohol and water and dried. The resulting terephthaloyl-bis-(5-amino-5'-benzoylamino-1,1'-dianthrimide) is a reddish-brown powder and dissolves in concentrated sulfuric acid with a greenish color.

Example 3

If, in the above example, the monobenzoyl-1,5-diamino-anthraquinone is replaced by monobenzoyl-1,4-diamino-anthraquinone, a violet anthrimide is obtained which has a greenish-olive solution color in concentrated sulfuric acid.

Example 4

30 parts of 1-amino-4-chloro-anthraquinone are heated with 12 parts of terephthaloyl chloride in 250 parts of nitrobenzol to 120–130° C. for one hour. The yellow crystalline mass is then cooled to 80–100° C. and filtered and washed.

20 parts of this terephthaloyl-di-(1-amino-4-chloro-anthraquinone) are condensed with 21.5 parts of monobenzoyl-1,5-diamino-anthraquinone in 400 parts of naphthalene in the presence of 15 parts of sodium acetate and 1 part of cuprous chloride at the boil. The mass is diluted with 200 parts of chlorobenzol or toluol, and filtered at 100° C. The cake is worked up as usual. The resulting anthrimide is a brown powder, soluble in concentrated sulfuric acid with an olive color.

*Example 5*

If, in the above example, the monobenzoyl-1,5-diamino-anthraquinone is replaced by mono-benzoyl-1,4-diamino - anthraquinone, a blackish anthrimide is obtained.

*Example 6*

12.8 parts of 1-amino-5-chloro-anthraquinone are suspended in 300 parts of nitrobenzol and heated to 70–80° C. At this temperature 10.1 parts of terephthaloyl chloride, dissolved in 50 parts of nitrobenzol, are added over a period of ½ hour. The temperature is maintained for 30 minutes longer and then 12.8 parts of 1-amino-4-chloro-anthraquinone are added and the mass heated to 120–130° C. for one hour. After cooling, the crystalline precipitate is filtered, washed and dried.

20 parts of the above terephthaloyl-di-(1-amino-5-(-4-)-chloro-anthraquinone) are boiled with 21.5 parts of mono-benzoyl-1,5-diamino-anthraquinone, 18 parts of potassium acetate anhydride and 1 part of cupric chloride in 400 parts of nitrobenzol for several hours. The mass is then cooled and filtered and worked up as usual. The resulting mixed bis-anthrimide is a brown product and dissolves in concentrated sulfuric acid with a brownish color.

*Example 7*

12 parts of benzophenone-p,p'-dicarboxylic acid are suspended in 120 parts of nitrobenzol and 15–20 parts of thionyl chloride are added. The suspension is heated to 70–80° C. for 2–3 hours and the excess thionyl chloride removed by blowing air through the solution. 22 parts of 1-amino-5-chloro-anthraquinone and 130 parts of nitrobenzol are then added and the mass is heated to 130–140° C. for one hour. After cooling to 80° C. the yellow crystalline product is filtered off, washed and dried.

15 parts of the above condensation product are heated with 10.3 parts of monobenzoyl-1,5-diamino-anthraquinone, 10 parts of sodium acetate and 0.5 parts of cupric chloride in 250 parts of nitrobenzol to the boil for 4–5 hours. After cooling, the anthrimide is filtered off, washed and dried. It is a dark brown powder which dissolves in concentrated sulfuric acid with a dirty brownish color.

*Example 8*

In the first condensation of the above example, the benzophenone dicarboxylic acid may be replaced by 10 parts of diphenyl-p,p'-dicarboxylic acid. The anthrimide resulting from the latter condensation product has similar properties to the one mentioned in Example 7.

1-amino-3-bromo - anthraquinone, 1-amino-3-chloro-anthraquinone, 1-amino-7-chloro-anthraquinone or 1-amino-8-chloro-anthraquinone may be used in place of the particular amino-chloro-anthraquinone compounds specified in the above examples.

It is understood that the dicarboxylic acid chlorides mentioned in the foregoing examples merely illustrate our invention and that these may be substituted by other dicarboxylic acid chlorides in the preparation of similar dyestuffs. The acid chlorides of the following dicarboxylic acids are mentioned to illustrate the broad scope of our invention, which includes the use of those of the aliphatic, carbocyclic and heterocyclic series; diphenylmethane-3,3'- or 4,4'-dicarboxylic acids; naphthalene-dicarboxylic acids; isophthalic acid; diphenylether-3,3'- or 4,4'-dicarboxylic acid; terphenyl-dicarboxylic acids; perylene dicarboxylic acids; diphenylene oxide dicarboxylic acid; phenanthrene dicarboxylic acid; diphenylene-2,2'-azone-dicarboxylic acid; succinic acid; adipic acid; fluorenone dicarboxylic acids; quinoline dicarboxylic acid; carbazole dicarboxylic acids; diphenylene-sulfide-dicarboxylic acids, etc.

In place of the alpha-amino-anthraquinone and the mono-benzoyl-diamino-anthraquinones mentioned in the specific examples, other alpha or beta-substituted amino-anthraquinone compounds may be used, such as 1-amino-5-para-toluyl-sulfonamido - anthraquinone, 1-amino-4-phthalimido - anthraquinone, 1-amino-6-chloro-anthraquinone and 1-amino-5-acetylamino-anthraquinone or other amino-aroylamino-anthraquinones of the aliphatic, benzene, naphthalene or anthraquinone series, such as 1-amino-5-naphthoylamino-anthraquinone or 1-amino-5-anthraquinonoylamino- anthraquinone. W h e n amino-anthraquinones containing readily hydrolyzable acid imide groups are used, it is possible, after condensation is completed, to hydrolyze off these groups in acid or alkali solution, leaving free amino groups, thereby permitting further condensation with other acid chlorides or chloro compounds of the aliphatic or aromatic series. By a selection of the particular substituted amino anthraquinone compound, or by the use of readily hydrolyzable acidylamino-anthraquinone compounds, a large variation of the substituted acidyl-bis-(alpha-amino-dianthrimides) may be prepared.

By the process as above described, new di-alpha, alpha - (anthraquinonyl - amino - anthraquinone)-dicarboxylic acid di-imides of the following general formula are obtained:

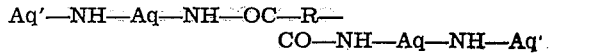

wherein R represents an aliphatic, carbocyclic or heterocyclic radical, and the Aq's represent anthraquinone groups which may be unsubstituted or which may contain acidylamino groups of the benzene, naphthalene or anthraquinone series, such as benzoylamino, toluoylamino, naphthoyl-amino, alpha or beta - anthraquinonylamino, chloro-anthraquinonylamino or heterocyclic acid amino compounds such as are obtained from anthrathiazole-2-carboxylic acid, thiophene-anthrone-carboxylic acids, etc., chlorine, NH₂, or readily hydrolyzable acidylamino groups such as para-toluyl-sulfonamide, phthalimide, etc., or other simple monovalent substituents.

The di-alpha,alpha-(anthraquinonylamino-anthraquinone)-dicarboxylic acid di-imides may be ring-closed with acid condensing agents to form anthrimide carbazole vat dyestuffs which dye cotton from orange to brown and olive shades and have excellent fastness properties.

We claim:

1. A di-alpha, alpha-(anthraquinonyl-amino-anthraquinone)-dicarboxylic acid di-imide.

2. A compound of the general formula:

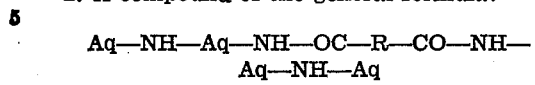

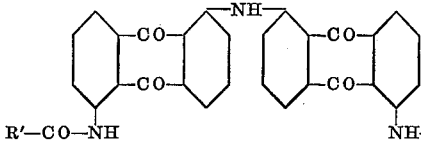

wherein R stands for an organic radical of an organic dicarboxylic acid and wherein the Aq's represent anthraquinone groups, the anthraquinone acid imide linkages being in alpha-position and wherein the end anthraquinone radicals may contain acylamino groups in alpha positions.

3. Compounds of the general formula:

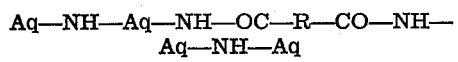

wherein R stands for an organic radical of an organic dicarboxylic acid and wherein the Aq's represent anthraquinone groups attached to the acid imide and to the amine groups in alpha-position.

4. Compounds of the general formula:

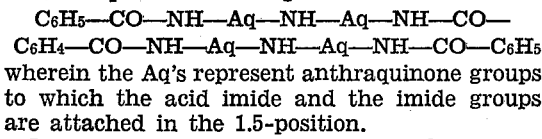

wherein the Aq's represent anthraquinone groups to which the acid imide and the imide groups are attached in the 1.5-position.

5. Compounds of the general formula

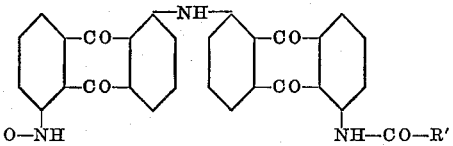

in which R represents an organic radical of an organic dicarboxylic acid and R' represents organic radicals of an organic carboxylic acid.

6. In the process for preparing di-alpha, alpha-(anthraquinonyl-amino - anthraquinone)-dicarboxylic acid di-imides, the step which comprises condensing a compound of the formula

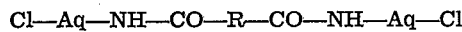

wherein R represents an organic radical of an organic dicarboxylic acid, with an amino-anthraquinone which may contain as a substituent an acylamino group.

RALPH N. LULEK.
CLARENCE F. BELCHER.